(12) United States Patent
Fine

(10) Patent No.: US 8,824,962 B2
(45) Date of Patent: Sep. 2, 2014

(54) SYSTEM ENABLING THE CONTACTLESS TRANSFER OF PERSONAL DATA

(75) Inventor: Jean-Yves Fine, Marseilles (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 13/505,624

(22) PCT Filed: Oct. 26, 2010

(86) PCT No.: PCT/EP2010/066194
§ 371 (c)(1),
(2), (4) Date: May 23, 2012

(87) PCT Pub. No.: WO2011/054705
PCT Pub. Date: May 12, 2011

(65) Prior Publication Data
US 2012/0225648 A1    Sep. 6, 2012

(30) Foreign Application Priority Data

Nov. 3, 2009   (EP) .................................... 09306049

(51) Int. Cl.
*H04B 5/00* (2006.01)
*H02J 7/02* (2006.01)

(52) U.S. Cl.
CPC *H02J 7/025* (2013.01); *H02J 7/027* (2013.01)
USPC ........ 455/41.1; 455/41.2; 455/39; 455/456.1; 455/456.4

(58) Field of Classification Search
CPC ........................................................ H02J 7/025
USPC ........................................ 455/41.1, 41.2, 558
See application file for complete search history.

(56) References Cited

U.S. PATENT DOCUMENTS

| 7,374,100 | B2* | 5/2008 | Jei et al. ......................... 235/492 |
| 8,203,431 | B2* | 6/2012 | Graeber ....................... 340/10.1 |
| 2003/0107523 | A1 | 6/2003 | Yahata et al. |
| 2004/0166807 | A1 | 8/2004 | Vesikivi et al. |
| 2004/0203352 | A1* | 10/2004 | Hall et al. .................... 455/41.1 |
| 2006/0132289 | A1 | 6/2006 | Conraux |
| 2007/0187266 | A1* | 8/2007 | Porter et al. .................. 206/232 |
| 2009/0298532 | A1 | 12/2009 | Richter |

FOREIGN PATENT DOCUMENTS

| DE | 10 2005 059 149 A1 | 6/2007 |
| EP | 0 762 535 A1 | 3/1997 |
| EP | 0 786 916 A1 | 7/1997 |
| EP | 1 034 670 A1 | 9/2000 |
| EP | 1 672 388 A1 | 6/2006 |

OTHER PUBLICATIONS

International Search Report (PCT/ISA/210) issued on Dec. 3, 2010, by the European Patent Office as the International Searching Authority for International Application No. PCT/EP2010/066194.

* cited by examiner

*Primary Examiner* — Charles Appiah
*Assistant Examiner* — Randy Peaches
(74) *Attorney, Agent, or Firm* — Buchanan Ingersoll & Rooney PC

(57) ABSTRACT

The invention relates to a system enabling the contactless transfer of personal data from a mobile terminal including a first antenna coupled to a first chip cooperating with a first memory to a second memory cooperating with a second chip, with said second chip being coupled to a second antenna. According to the invention, the second memory is included in a passive radiofrequency transponder supplied by the electromagnetic field emitted by said first antenna during said transfer of personal data.

5 Claims, 1 Drawing Sheet

SYSTEM ENABLING THE CONTACTLESS TRANSFER OF PERSONAL DATA

Figure 1:
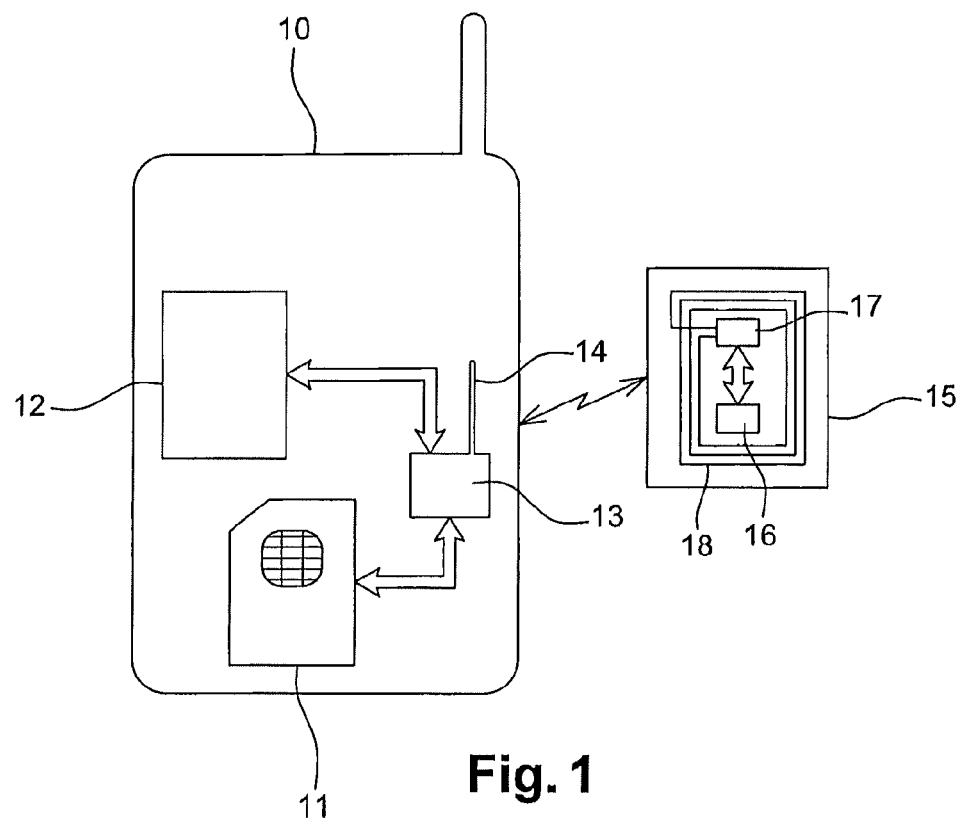

The invention relates to the field of mobile radio-telephony and more precisely to a system enabling the contactless transfer of personal data.

In a mobile radio-telephony system for example of the GSM or 3G types, mobile user terminals communicate with base stations belonging to the telecommunications network.

Each mobile terminal conventionally includes an antenna, a screen, a keyboard, as well as a secured element such as a SIM (in GSM) or USIM (in 3G) card.

The (U)SIM card is controlled by the network operator which can read or write data therefrom/therein. The mobile terminal user can also access the SIM card, more particularly in order to store therein personal data such as telephone numbers and the names of the persons or organizations associated with such telephone numbers. Such personal data can also be photographs, videos or pieces of music in MP3 format.

Upon the user's decision, such personal data can be stored in a memory of the mobile terminal itself. When the user wishes to change his/her mobile terminal, he/she transfers his/her personal data from the memory of his/her former mobile terminal to his/her (U)SIM card which can then be inserted into his/her new mobile terminal so that he/she can resume using his/her personal data.

A problem often arises when the user loses his/her mobile terminal: all the personal data that was stored therein, whether in the (U)SIM card or in the terminal itself, is lost if the user did not back it up elsewhere, beforehand.

Patent EP-1034670 proposes a solution to this problem. This solution consists, on the user's initiative, in transferring the personal data existing in his/her SIM card to a remote server, for instance through VCO. All his/her personal data is then stored in a remote server. If the user loses his/her mobile terminal, he/she will buy a new SIM card and a new mobile terminal and request the network operator to transmit, from the remote server to his/her new SIM card, the personal data that were stored therein. The user can thus retrieve his/her personal data.

The drawback of this solution is that the service of storing the personal data must be paid by the user to the operator, either monthly, or upon each backing up of personal data.

Another solution consists in backing up the personal data stored in the mobile terminal into a personal computer. This type of backup is called a "synchronisation". The drawback of this solution is that the user must think of executing a synchronisation at regular intervals, otherwise the personal data he/she has stored in his/her mobile terminal after the last synchronisation would not be backed up.

Another drawback resides in that a personal computer can fail, be stolen or have to be re-configured, for instance, further to being infected with a computer virus. In such cases, the personal data is generally lost.

In the field of mobile telephony, contactless, also called NFC (Near Field Communications—Communication en champ proche in French) transactions are known. Such transactions are generally of the banking type, i.e. they mainly concern the payment for goods or services to storekeepers.

The NFC technology also enables the exchange of visit cards between two persons using mobile terminals. For this purpose, a first mobile terminal includes a first antenna coupled with a first chip cooperating with a first memory containing the first user's visit card. The second user's mobile terminal includes a second memory cooperating with a second chip, with the second chip being coupled to a second antenna. The transmission of the first user's visit card from his/her terminal to the second user's terminal can be executed when the first user willingly transmits his/her visit card, without contact, to the second user's terminal (into the second memory, via the second antenna).

However, this solution is not interesting if personal data is backed up since the second terminal does not generally belong to the first user and such second terminal is not intended for backing up the first user's personal data.

The present invention more particularly aims at remedying such drawbacks.

More precisely, one of the aims of the invention is to provide a simple, efficient and low-cost system for backing up personal data stored in a mobile terminal.

This aim, together with other ones which will be mentioned later, is reached by a system according to claim 1.

Using a passive radiofrequency transponder makes it possible to remedy the above-mentioned problems since it requires no ground power supply, and can be composed of a compact element such as a tag or a contactless card.

The tag preferably includes an adhesive face so that it is made integral with a substrate. This makes it possible not to lose the tag.

In an advantageous embodiment, the first memory includes the personal data.

The personal data preferably includes the contacts and the associated telephone numbers stored in the mobile terminal.

Figure 2:
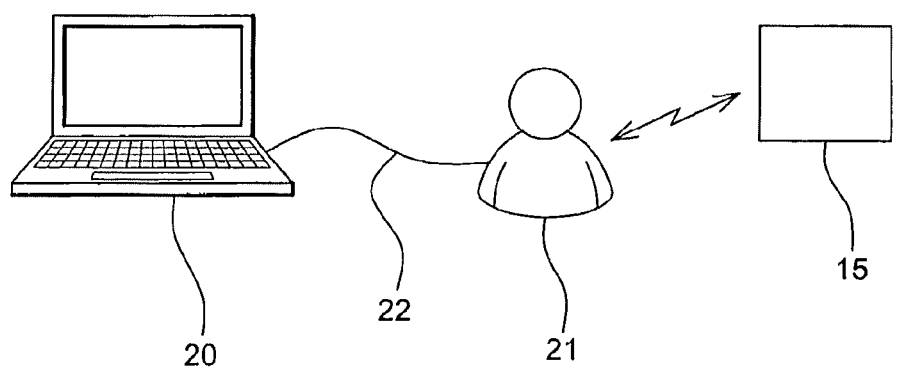

Other characteristics and advantages of the invention will appear when reading the following two advantageous embodiments of the invention, which are given as a non-limitative illustration, and referring to the appended Figures showing:

FIG. 1, a first preferred embodiment of the system according to the invention;

FIG. 2, a second preferred embodiment of the system according to the invention.

In the appended FIG. 1, a mobile terminal 10 is intended for communicating within a mobile radio-telephony network. The terminal 10 conventionally includes a keyboard and a screen (not shown), as well as a secured element 11 managed by the network operator. Such secured element 11 is either a conventional SIM card (in the GSM system) or a USIM card (in the third generation system). The (U)SIM card includes a first memory (not shown) more particularly containing the personal data belonging to the terminal 10 holder.

The personal data includes the contacts and the associated telephone numbers of the terminal 10 holder.

Now, or additionally, the terminal 10 may also include a memory 12 wherein the contacts and the associated phone numbers belonging to the terminal 10 holder are stored.

The memories 11 and 12 are connected by buses to a first chip 13, typically a NFC chip. The chip 13 is coupled to an antenna 14 so that it can send and/or receive data, and more particularly the personal data stored in the memories 11, 12 to/from an element outside the terminal 10. According to the invention, such personal data can be stored in a passive radiofrequency transponder 15 supplied by the electromagnetic field emitted by the antenna 14 during the transfer of personal data. The transponder 15 therefore includes a second memory 16 cooperating with a second chip 17, with said second chip 17 being coupled to a second antenna 18, preferably of the NFC type too.

The transponder 15 may be composed of a tag or a contactless card, for instance.

The advantage of using a tag for storing personal data is as follows: a tag is a very low-cost, self-contained element, which can be stuck on various substrates, for instance on an address book, on a desk drawer or a building hall. It needs not be supplied, has no market value and thus almost no risk of being stolen, and the failure probability is much less than that of a personal computer. Each member in a family or each employee in a company can thus own a tag for a very low cost, of the order of a few Euros. The same is true for a contactless card which cannot, however, be straight away positioned on any (preferably not metallic) substrate and which can thus be lost. For this purpose, the tag according to the invention is of the electronic tag type and includes an adhesive face so that it is made integral with a substrate.

The tag is of the RFID (for Radio Frequency IDentification) type and operates according to a NFC approach.

Electronic tags are small objects, such as self-adhesive tags, which can be stuck onto, or integrated into objects. Radio-tags include antennas associated with electronic chips which enable these to receive and to answer the radio-emitted requests from the emitter—receiver, represented by the user's mobile terminal.

The electromagnetic field emitted by the mobile terminal 10 antenna 14 makes it possible to supply the chip 17 and the memory 16 during the transfer of the personal data from the memory 11 or 12 to the memory 16. The chips 13 and 17 manage the reading and writing operations of such memories, using appropriate software.

As regards the writing operation from the terminal 10 to the tag 15, such software is integrated in the chip 13 or in the memories 11 or 12. Software is actuated by the user upon the backup of his/her personal data, as he/she would do for a synchronisation, as mentioned above. The man-machine interface composed of the keyboard and the screen of the terminal 10 enables the user to execute this transfer.

One typical case of the system utilisation is as follows: when the terminal 10 user wishes to execute the backup of the personal data stored in his/her mobile terminal, he/she activates the backup function on his/her terminal 10 and places it close to the tag 15. His/her personal data shall be automatically transferred into the memory 16 in a few seconds, and he/she will only have to move away therefrom to end the backup procedure. Personal data can be globally or partially backed up, i.e. all or part of the personal data selected beforehand (all or part of his/her photographs, all or part of his/her phone book, the latest phone numbers he/she stored in his/her terminal, or even a voice or SMS-type message, which he/she wishes to transfer to a member of his/her family or one of his/her colleagues) will be copied into the memory 16.

The tag 15 can thus be used as an electronic post-it (registered trademark). It can be expected that the user alone will be authorized to access the personal data stored in the tag 15, or that such data can be shared with several other users, for instance the members of a family. Access to the stored data may be conditioned to the positive checking of a password, for instance through the PIN code of the person wishing to read data contained in the tag 15.

The chip 17 can include a microprocessor in order to limit access to the information stored in the memory 16. A password can then be requested to access thereto. It is then also possible to enable several mobile terminal users to write data into the memory 16 and to read data therefrom, thanks to different codes. Each user will use his/her own PIN code, for instance, to write data into a portion of the memory 16 or to read previously stored data therefrom.

The tag 15 can be operated in UHF (900 MHz) or in RFID (13.56 MHz), since the operation frequency does not matter much.

The personal data stored in the tag 15 can be secured or not. When data is secured, it can be secured by the mobile terminal 10 which enciphers the stored personal data, for instance using the user's PIN code, or the tag 15 itself, if it includes a microprocessor (the tag enciphers the data transferred from a previously transferred PIN code, during a setting or learning phase).

FIG. 2 shows a second preferred embodiment of the system according to the invention.

In this embodiment, the mobile terminal is composed of a personal computer 20 cooperating with a reader 21 of the NFC type, for instance through a USB connection 22. The reader 21 includes the first antenna coupled to the first chip cooperating with the first memory. The first memory is included in the personal computer 20. As mentioned above, the reader 21 communicates with the tag 15 so that it can read and write personal data therein or therefrom.

The above description is given as a simple illustrative and not limiting example and the specialists will easily imagine other possible embodiments of this invention, while remaining within the frames of claims.

The invention claimed is:

1. A system enabling the contactless transfer of personal data from a mobile terminal including a first antenna coupled to a first chip cooperating with a first memory to a second memory cooperating with a second chip, with said second chip being coupled to a second antenna, wherein
said second memory is included in a passive radiofrequency transponder device separate from the mobile terminal and supplied with energy by the electromagnetic field emitted by said first antenna during said transfer of personal data, and
said personal data includes the contacts and the associated phone numbers stored in said mobile terminal.

2. A system according to claim 1, wherein said first memory includes said personal data.

3. A system according to claim 1, wherein said passive radiofrequency transponder is composed of a tag.

4. A system according to claim 3, wherein said tag includes an adhesive face so that it is made integral with a substrate.

5. A system according to claim 1, wherein said passive radiofrequency transponder is composed of a contactless card.

* * * * *